United States Patent
Topp et al.

(10) Patent No.: US 11,596,163 B2
(45) Date of Patent: Mar. 7, 2023

(54) FROZEN CONFECTION AND PROCESS OF MAKING

(71) Applicant: Conopco, Inc., Englewood Cliffs, NJ (US)

(72) Inventors: Elizabeth Joan Topp, Suffern, NY (US); Susan Margaret Turan, Wellingborough (GB); David Carlton Lovano, Delaware, OH (US); Michael Dobert Hoyt, Flemington, NJ (US)

(73) Assignee: Conopco, Inc., Englewood Cliffs, NJ (US)

(*) Notice: Subject to any disclaimer, the term of this patent is extended or adjusted under 35 U.S.C. 154(b) by 201 days.

(21) Appl. No.: 15/325,879

(22) PCT Filed: Jul. 21, 2015

(86) PCT No.: PCT/EP2015/066631
§ 371 (c)(1),
(2) Date: Jan. 12, 2017

(87) PCT Pub. No.: WO2016/016045
PCT Pub. Date: Feb. 4, 2016

(65) Prior Publication Data
US 2017/0156366 A1 Jun. 8, 2017

Related U.S. Application Data

(60) Provisional application No. 62/130,837, filed on Mar. 10, 2015, provisional application No. 62/030,530, filed on Jul. 29, 2014.

(51) Int. Cl.
| | |
|---|---|
| *A23G 9/46* | (2006.01) |
| *A23G 9/14* | (2006.01) |
| *A23G 9/22* | (2006.01) |
| *A23G 9/32* | (2006.01) |
| *A23G 9/48* | (2006.01) |

(52) U.S. Cl.
CPC ............ *A23G 9/46* (2013.01); *A23G 9/14* (2013.01); *A23G 9/22* (2013.01); *A23G 9/224* (2013.01); *A23G 9/32* (2013.01); *A23G 9/327* (2013.01); *A23G 9/48* (2013.01); *A23V 2002/00* (2013.01)

(58) Field of Classification Search
CPC . A23G 9/327; A23G 9/46; A23G 9/32; A23G 9/14
USPC ...................................................... 426/100
See application file for complete search history.

(56) References Cited

U.S. PATENT DOCUMENTS

| | | | |
|---|---|---|---|
| 1,528,077 A * | 3/1925 | Rosenfield | A23L 25/10 |
| | | | 426/633 |
| 2,669,946 A | 2/1954 | Peyton et al. | |
| 2,774,314 A | 12/1956 | Moser | |
| 2,816,518 A | 12/1957 | Daggett | |
| 2,978,996 A | 11/1961 | Moser | |
| 3,014,437 A | 12/1961 | Dutchess | |
| 3,291,076 A | 12/1966 | Flanigan et al. | |
| 3,408,960 A | 11/1968 | Stanley | |
| 3,477,393 A | 11/1969 | Bell | |
| 5,209,942 A | 5/1993 | Bauer et al. | |
| 5,968,582 A | 10/1999 | Vaghela | |
| 6,193,494 B1 | 2/2001 | Daouse | |
| 2003/0031758 A1* | 2/2003 | Koss | A23G 9/04 |
| | | | 426/72 |
| 2003/0068409 A1 | 4/2003 | Bindley et al. | |
| 2003/0134025 A1 | 7/2003 | Vaghela et al. | |
| 2006/0102016 A1 | 5/2006 | Ulrich et al. | |
| 2008/0220141 A1 | 9/2008 | Quail et al. | |
| 2011/0177209 A1 | 7/2011 | Farina | |
| 2016/0165921 A1 | 6/2016 | Ando et al. | |

FOREIGN PATENT DOCUMENTS

| | | |
|---|---|---|
| AU | 2004276757 | 4/2005 |
| CA | 570098 | 2/1959 |
| CA | 687293 | 5/1964 |
| CA | 883029 | 10/1971 |
| EP | 1277411 | 1/2003 |
| GB | 897820 | 5/1962 |
| GB | 914331 | 1/1963 |
| GB | 1386955 | 3/1975 |

(Continued)

OTHER PUBLICATIONS

Tiffany Homemade Peanut Butter Ice Cream—(no cooking required) pp. 1-5 Jun. 2013 https://eatathomecooks.com/homemade-peanut-butter-ice-cream-no-cooking-required/ (Year: 2013).*

Aqua-calc https://www.aqua-calc.com/calculate/food-volume-to-weight pages printed Jun. 2018 (Year: 2018).*

What's Cooking America "Can size equivalents" p. 1 printed Jun. 2018 https://whatscookingamerica.net/Information/CanSize.htm (Year: 2018).*

DreamScoops "Air: The invisible Ice Cream ingredient" pp. 1-8 printed Jun. 2018 https://www.dreamscoops.com/ice-cream-science/air-in-ice-cream/ (Year: 2018).*

(Continued)

*Primary Examiner* — Jyoti Chawla
(74) *Attorney, Agent, or Firm* — Gerard J. McGowan, Jr.

(57) ABSTRACT

The process involves feeding a base aerated frozen confection having an overrun of from 20-150% from a freezer to a static mixer, feeding a viscous flavorant or other ingredient having a free oil level of at least 10% to the static mixer to combine with the base frozen confection, and mixing them in the static mixer to obtain a frozen confection including the viscous flavorant or other ingredient which is homogeneous to the eye and taste and which preferably has fewer crystalline fat structures per air bubble, which means greater stability of the air bubbles. The invention is also reflected in reduced standard deviation in product fill weight and an improved distribution of air bubbles. The invention also is directed to the frozen aerated confection.

19 Claims, 14 Drawing Sheets

(56) References Cited

FOREIGN PATENT DOCUMENTS

| WO | WO2005031226 | 4/2005 |
|---|---|---|
| WO | WO2014095307 | 6/2014 |
| WO | WO2015016389 | 2/2015 |
| WO | WO2015180957 | 12/2015 |

OTHER PUBLICATIONS

Advanced Mixing Technologies "Admixer" pp. 1-2 Nov. 2013 https://www.admix.com/pdfs/resourcelibrary-brochures-admixer.pdf (Year: 2013).*

Ruben "Roasted Hazelnut Ice Cream—Recipe" Ice Cream Science Feb. 2013, pp. 1-6 http://icecreamscience.com/roasted-hazelnut-ice-cream-recipe/ (Year: 2013).*

Paleoindx "Vanilla Hazelnut Ice Cream". Feb. 2013, pp. 1-4 https://paleoinpdx.com/2013/02/12/vanilla-hazelnut-ice-cream/ (Year: 2013).*

Inline Motionless Mixers, Encyclopedia of Chemical Technology, Jan. 1, 1995, 874-875, 16.

GX-3.4, Interpreting Homogeneity Claims in Laminar Flow Static Mixing Applications, Technical Bulletin, Aug. 17, 2009, pp. 1-8, TB-10.2.

IPRP2 in PCTEP2015066631, Nov. 2, 2016, pp. 1-15.

Marshall et al., Non-Dairy Fats, Ice Cream 6th Ed 2003 p. 69, 2003, 69, 6th Ed, Kluwer Academic/Plenum Publishers.

Search Report and Written Opinion in PCTEP2015066631, dated Jan. 7, 2016, pp. 1-13.

Stamixco LLC, For High Performance Mixing & Dispersion of Viscous Fluids, GX Static Mixer Product Bulleti, Feb. 14, 2012, pp. 1-8, GX-3.4, US.

Written Opinion in PCTEP2015066631, dated Jun. 23, 2016, pp. 1-6.

Search Report and Written Opinion in EP16205925; dated Apr. 4, 2017, pp. 1-9.

Search Report and Written Opinion in PCTEP2017083902; dated Feb. 6, 2018, pp. 1-15.

Written Opinion in PCTEP2017083902, dated Nov. 11, 2018, pp. 1-8.

IPRP2 in PCTEP2017083902; Apr. 5, 2019, pp. 1-15.

* cited by examiner

Figure 1 – Outlines the ice cream production process and the methods being investigated Figure 2 – Shows mixing flow diagram for static mixer in process

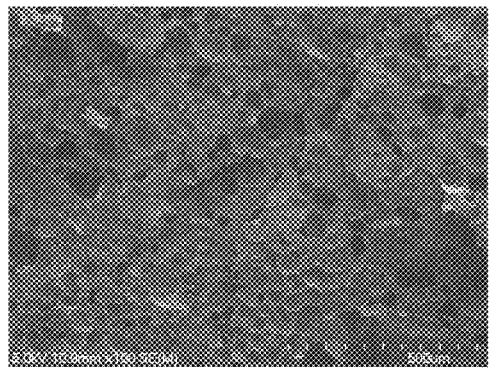 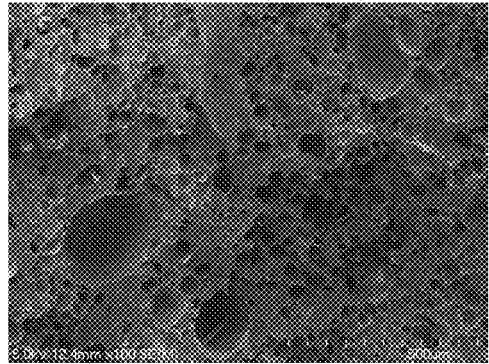
Static; 100x; 12% pb
Univat w/o Static; 100x; 12% pb
FIG. 3
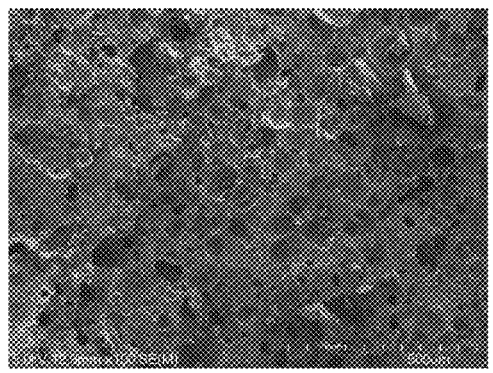 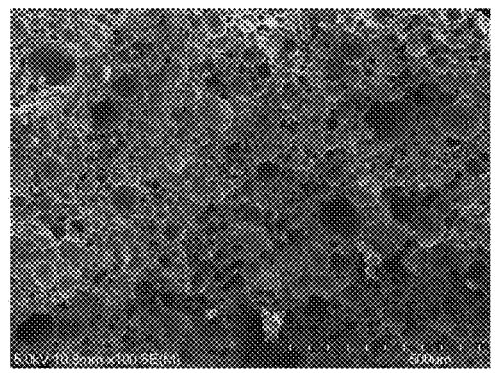
Static; 100x; 16% peanut butter
W/o Static; 100x; 16% peanut butter
FIG. 4

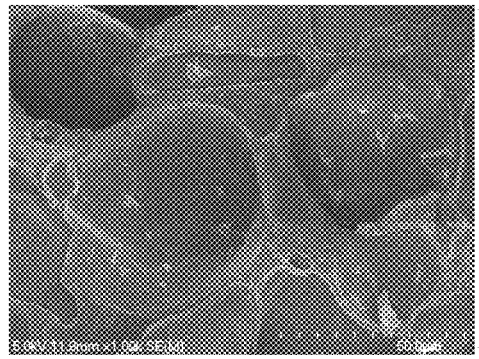
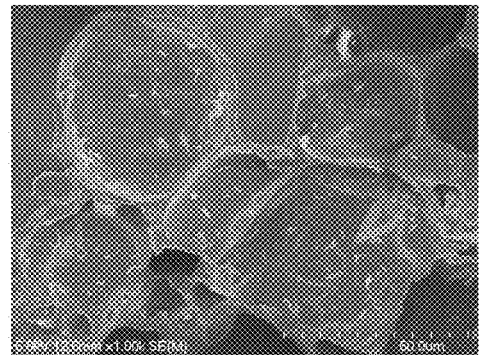
static; 1000x; 12% peanut butter        W/o Static; 1000x; 12% peanut butter
FIG. 5
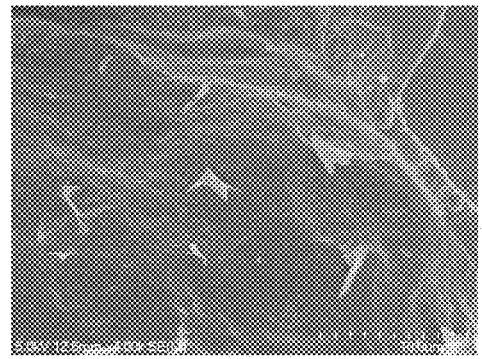
static; 4000x; 12% peanut butter        W/o Static; 4000x; 12% peanut butter
FIG. 6

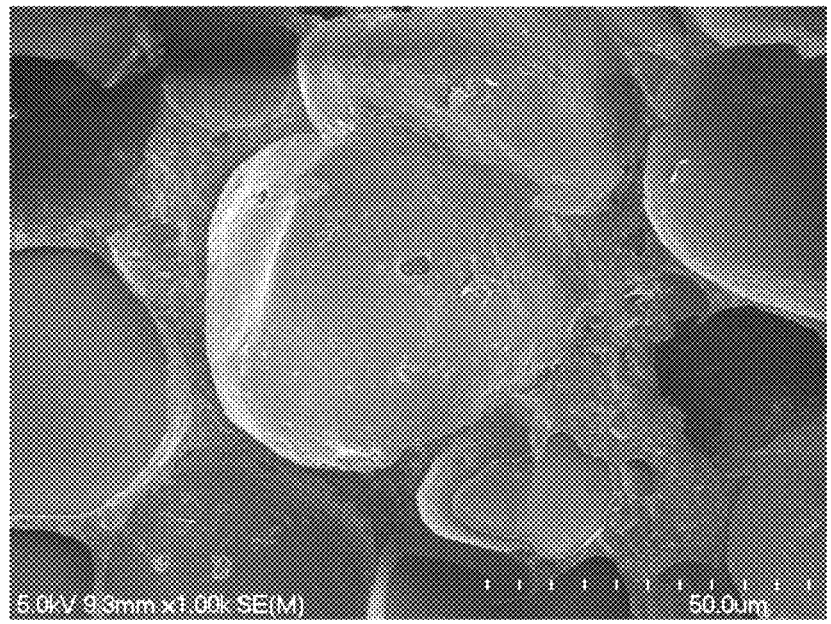
Static; 1000x; 5% hazelnut butter
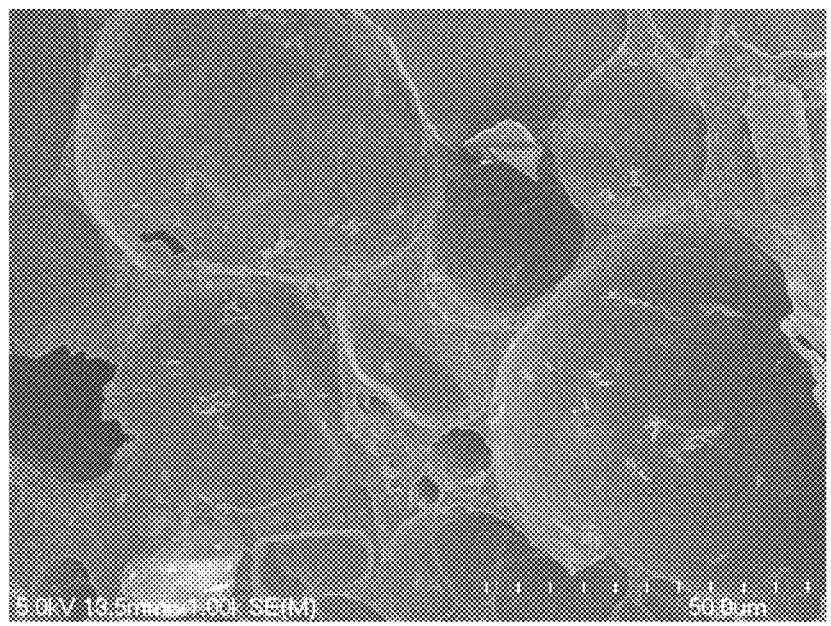
Non-static; 1000x; 5% hazelnut butter
FIG. 13

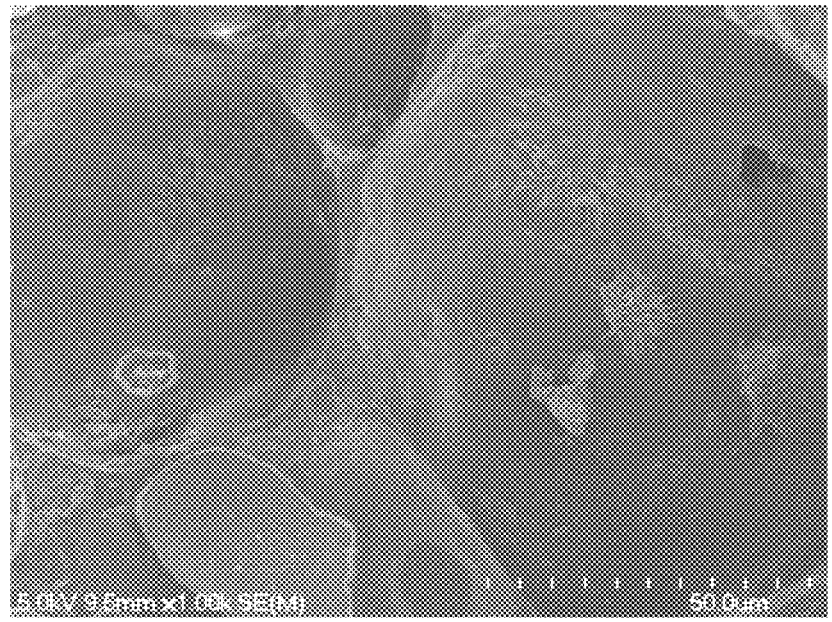
Static; 1000x; 12% hazelnut butter
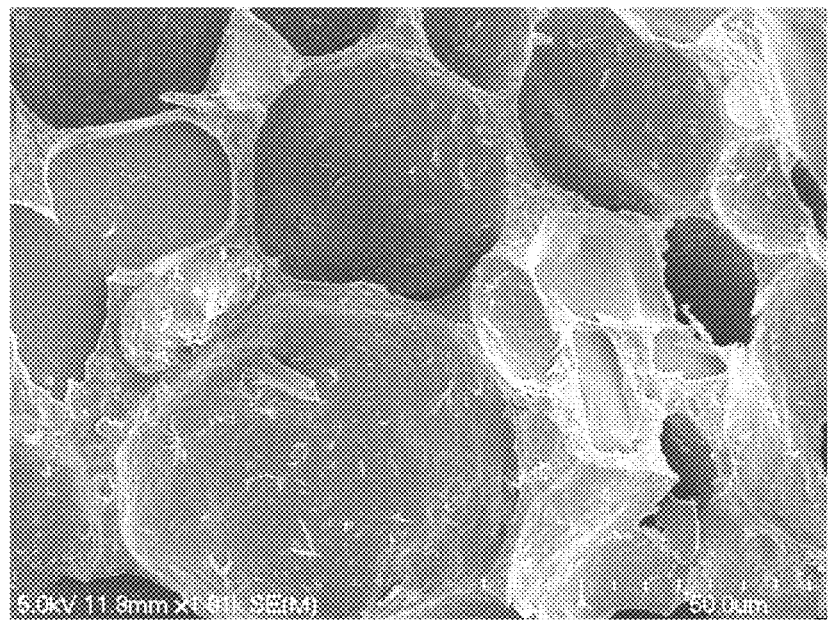
Non-static; 1000x; 12% hazelnut butter
FIG. 14

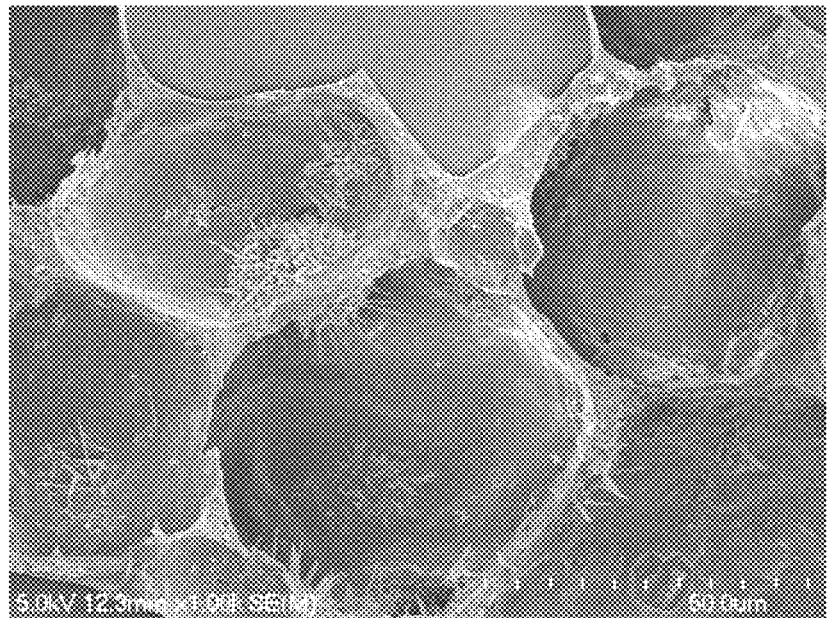
Static; 1000x; 20% hazelnut butter
Non-static; 1000x; 20% hazelnut butter
FIG. 15

FROZEN CONFECTION AND PROCESS OF MAKING

BACKGROUND OF THE INVENTION

Ice cream is an indulgence food much favored by consumers. Yet, ice cream manufacturers are always looking for ways to make their products even more appealing.

A well known route for improving aerated frozen confections such as ice cream involves incorporating viscous, free oil-containing flavorings into the product. In some cases, it is desired that the flavoring be incorporated in a way such that the frozen confection is homogeneous to the eye and the taste. One such flavoring desired by consumers is peanut butter.

Unfortunately, we have found that it is difficult to incorporate homogeneously large amounts of viscous, free oil-containing flavorings such as peanut butter into aerated frozen confections after they have been homogenized without risking poor texture, variable overrun and a high degree of weight variation. Indeed, it is known that too much liquid oil present during dynamic freezing leads to a poor air structure. This makes it difficult to produce high weight levels of homogeneous peanut butter frozen confection. While frozen confections with lower levels of peanut butter can be enjoyed, in order to furnish consumers with high quality products, it is desirable to be able to include higher levels of peanut butter in such products.

There is ample patent and other literature concerning mixing of ingredients.

Kirk-Othmer, Encyclopedia of Chemical Technology, 4$^{th}$ edition, Volume 16, John Wiley & Sons, 1995, pages 874-875 indicates that static mixers are used in food manufacture, e.g., oils, juices, beverages, milk, sauces, emulsifications and heat transfers.

WO 2005/031226 is directed to a method for combining cryogenically frozen food with conventional ice cream. The cryogenically frozen foods may include cranberries, pieces of other fruit, pieces of chocolate, various types of candies, pieces of cookie dough, or any of these covered in chocolate. In one embodiment, food particles are combined with a semi-frozen soft ice cream from a barrel freezer by a combining mechanism which forces the combination through a static mixer.

GB 1,386,955 discloses turbulence-promoting devices useful as mixers. They comprise a substantially circular section tube having a plurality of turbulence-promoting elements in engagement with the wall of the tube. They are described as static. The device is said to be particularly useful for mixing shear-sensitive materials such as yogurt with whole or comminuted fruit. The controlled mixing of ice cream to produce a ripple effect is also mentioned as an application.

Ulrich et al. US Patent Application Publication No. 2006/0102016 is directed to an apparatus for combining particulate and traditional ice cream. A pre-mixing device allows several compositions, not all of which must be liquid, such as powdered flavorings or other additives of a size small enough not to cause clogging in the feed assembly, to be mixed for delivery to the feed tray. Particulate ice cream beads are combined with semi-frozen soft ice cream from a barrel freezer by a stuffing pump, which forces the combination through a static mixer where it is blended and then output to a container for consumption.

GB 914,331 discloses a continuous ice cream freezer which receives liquid mix from one end, thoroughly mixes it with air using a helical mixer, and discharges it in the form of ice cream. The helical mixer is housed for rotation.

Vaghela et al. U.S. Pat. No. 5,968,582 discloses a process for producing a molded aerated frozen bar. The process includes preparing a mix of ingredients, whipping the mix to obtain an aerated mix, molding the aerated mix, and freezing the molded aerated mix.

It is known that free oil in an ice cream can interfere with air bubbles and result in poor texture. Marshall et al. "Ice cream," 6$^{th}$ edition, Springer, (2003) p. 69 discloses that if too much oil is present during dynamic freezing, it spreads at the air surface leading to collapse of air bubbles and undesirable texture.

SUMMARY OF THE INVENTION

The present invention is directed to a process of preparing a frozen confection containing a viscous, free oil-containing flavoring (or other viscous free oil-containing ingredient) and to a frozen confection which may be prepared by the process. By mixing in the viscous flavoring/ingredient using a static mixer after the base frozen confection has been subjected to treatment in the freezer, toward the end of the manufacturing process, it is possible to incorporate higher amounts of the viscous flavoring/ingredient into the product. Moreover, although the presence of viscous, free oil-containing flavorings/ingredients during conventional manufacturing can impair the quality of frozen confections, products made in accordance with the invention do not suffer from the poor texture, variable overrun and high degree of weight variation to which products made using conventional processes are subject.

The improved process of the invention is reflected in a reduced standard deviation for product. With the process of the invention, the standard deviation for product weight for a frozen confection over 1 hour of production with a sample size of at least 4 samples incorporating from 5-18 wt % of a viscous flavoring/ingredient having a free oil level of at least 10 wt % is advantageously less than 3.5%, especially less than 3%.

Another advantage to adding peanut butter or other viscous, free oil-containing flavorings after the confection has been subjected to freezing and aeration in the freezer is that since peanut butter is an allergen, addition later in the process minimizes the exposure of equipment to it as much as possible. For instance, adding peanut butter later in the process avoids the need to clean the freezer for peanut allergen specifically when switching flavors.

The frozen confection of the invention enjoys a more favorable distribution of air bubbles as reflected in a PDF (probability density function) for the largest bubble of at least 0.013, preferably at least 0.015, most preferably at least 0.018.

The frozen confection of the invention also has fewer crystalline fat structures per air bubble, which means greater stability of the air bubbles. Preferably, for a frozen aerated confection according to the invention flavored with a viscous free oil-containing flavorant or ingredient comprising at least 5 wt % viscous flavoring/ingredient and at least 80 wt % of a base frozen confection, there are fewer than 0.01 crystalline structures per square micron of air bubble. More preferably there are fewer than 0.009 structures per square micron of air bubble and most preferably fewer than 0.0075 structures per square micron of air bubble. The frozen aerated confection more preferably includes from 6-20 wt % of the viscous oil-containing flavoring/ingredient.

In accordance with a preferred aspect of the invention, the frozen confection of the invention is homogeneous to eye and taste, notwithstanding the incorporation of the viscous, free oil-containing flavorant or other ingredient. The invention is also reflected in a consistent line speed comparable for the same product without viscous flavorings.

The process of the invention is particularly advantageous for free oil-containing, viscous flavorings such as peanut butter, hazelnut butter, almond butter and other nut butters, and for coconut pastes. Viscous, free oil-containing flavorings or other ingredients containing at least 10 wt % free oil are particularly preferred. Typically, the free oil will constitute up to 60 wt % of the flavoring/ingredient. The flavorings/ingredients used in the invention are non-particulate and may be in the form of a paste or a butter.

Preferably, then, the invention involves feeding a base aerated frozen confection having an overrun of from 20-150% from a freezer to a static mixer, feeding a viscous flavorant or other ingredient having a free oil level of at least 10% to the static mixer to combine with the base frozen confection, and mixing them in the static mixer to obtain a frozen confection including the viscous flavorant or other ingredient which is homogeneous to the eye and taste and which preferably has fewer crystalline fat structures per air bubble, which means greater stability of the air bubbles. Preferably for a frozen aerated confection according to the invention flavored with a viscous free oil-containing flavorant or ingredient comprising at least 5 wt % viscous flavoring/ingredient and at least 80 wt % of a base frozen confection, there are fewer than 0.01 crystalline structures per square micron of air bubble, more preferably fewer than 0.009 structures per square micron of air bubble and most preferably fewer than 0.0075 structures per square micron of air bubble. The advantage of the compositions of the invention in this respect increases with increasing levels of viscous ingredient such as for 10 wt % and greater, viscous ingredient, and 15 wt % and greater viscous ingredient. Preferably the standard deviation for tub weight of the frozen confections is less than 3.5%. The level of viscous flavorant or other ingredient is preferably from 5-18 wt %, preferably from 8-16 wt %.

For a more complete of the above and other features and advantages of the invention, reference should be made to the following description of the preferred.

BRIEF DESCRIPTION OF THE DRAWINGS

FIG. 3 shows scanning electron microscope (SEM) images of ice cream microstructure for a) on the left, an ice cream made using the Static mixer process of the invention at 100× magnification where the ice cream contained 12% peanut butter and b) on the right, ice cream made using the conventional process using a univat without a Static mixer at 100× magnification where the ice cream contained 12% peanut butter.

FIG. 4 shows SEM images of ice cream microstructure for a) on the left, an ice cream made using the Static mixer process at 100× magnification where the ice cream contained 16% peanut butter and b) on the right, ice cream made using the conventional process using a univat without a Static mixer at 100× magnification where the ice cream contained 16% peanut butter.

FIG. 5 shows SEM images of ice cream microstructure for a) on the left, an ice cream made using the Static mixer process at 1000× magnification where the ice cream contained 12% peanut butter and b) on the right, ice cream made using the conventional process using a univat without a Static mixer at 1000× magnification where the ice cream contained 12% peanut butter.

FIG. 6 shows SEM images of ice cream microstructure for a) on the left, an ice cream made using the Static mixer process at 4000× magnification where the ice cream contained 12% peanut butter and b) on the right, ice cream made using the conventional process using a univat without a Static mixer at 4000× magnification where the ice cream contained 12% peanut butter.

FIG. 13 shows SEM images taken at 1000× magnification of ice cream microstructure for a) on the top, an ice cream made using the Static mixer process of the invention where the ice cream contains 5% hazelnut butter and b) on the bottom, ice cream made using the conventional process using a univat without a Static mixer where the ice cream contains 5% hazelnut butter.

FIG. 14 shows SEM images of ice cream microstructure taken at 1000× magnification for a) on the top, an ice cream made using the Static mixer process of the invention where the ice cream contains 12% hazelnut butter and b) on the bottom, ice cream made using the conventional process using a univat without a Static mixer where the ice cream contains 12% hazelnut butter.

FIG. 15 shows SEM images of ice cream microstructure taken at 1000× magnification for a) on the top, an ice cream made using the Static mixer process where the ice cream contains 20% hazelnut butter and b) on the bottom, ice cream made using the conventional process using a univat without a Static mixer where the ice cream contains 20% hazelnut butter.

DETAILED DESCRIPTION OF THE INVENTION

Figure 1:
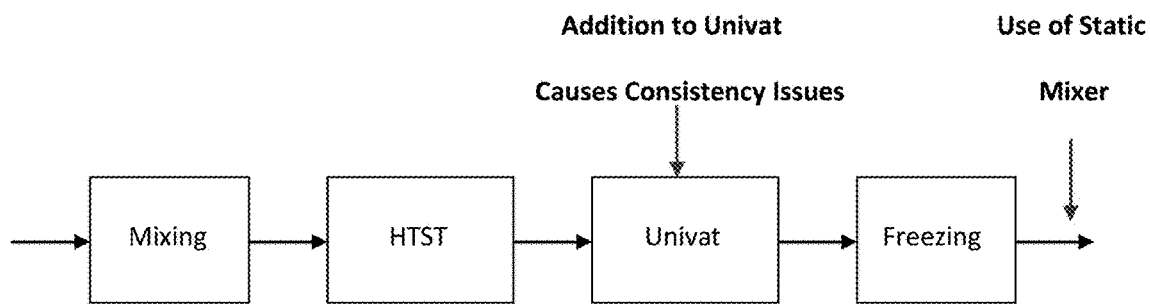
FIG. 1 is a schematic diagram of a first part of the ice cream production process, showing conventional steps other than feeding to the static mixer.

In contrast to more typical levels for peanut butter and other viscous flavorings incorporated into frozen confections made by conventional processes of 0.5-5 wt %, it is believed that the present process will permit higher levels of viscous, free oil-containing, flavorant or other ingredient of from 5-20 wt %, especially from 6-18 wt %, preferably from 8-15 wt %, most preferably from 11-15 wt %, while still providing a confection with good texture, consistent overrun and low degrees of weight variation.

While not wishing to be bound by theory, it is believed that the free oil in viscous flavorings such as peanut butter adversely impacts the aeration of the mix, resulting in the poor texture, variable overrun and high degree of weight variation in production. By adding the viscous, free oil-containing flavoring after the freezing and aeration step, the interaction between the free oil and the aeration is avoided. Similar adverse interactions between oil and air bubbles are believed not to occur with the oil present as part of the frozen confection in conventional steps prior to combination with the flavorant/ingredient since the size of such bubbles are reduced during homogenization.

Viscous flavorings or other ingredients are non-solids. They are preferably soft enough (generally semi-solid or liquid) to be pumped to the static mixer and, after mixing in the static mixer, form a frozen confection which is homogeneous to taste and to the eye. One of ordinary skill can ascertain whether the flavorant/ingredient is sufficiently non-solid. Examples of viscous flavorings include nut pastes such as peanut butter, almond butter, etc.

The viscous flavoring is preferably present in the frozen confection at levels of from 2.5 to 20 wt %, especially from 5-16 wt %. The base frozen confection is preferably present at from 97.5 to 70 wt %, especially from 80 to 96 wt %.

A preferred viscous flavoring is peanut butter base having 10-60 wt % free oil.

One of ordinary skill will be able to determine the level of free oil in a flavoring/ingredient, e.g., by checking how much oil settles out of the flavoring/ingredient in 5 days.

Static mixers are motionless mixers which derive the fluid motion or energy dissipation needed for mixing from the flowing fluid itself. They comprise repeated structures referred to as mixing elements attached inside a pipe. The mixing elements divide and recombine fluids which pass therethrough. A static mixer useful in the present invention, Model No. GXM-3.834 inch, is available from StaMixCo of Brooklyn, N.Y. A number of static mixing elements, such as 6, may be used in series. One of ordinary skill can ascertain the number of static mixing elements needed for a particular application. A center point sparger may be located just prior to the first static mixing element.

The base frozen confection (prior to combining with the viscous flavorant/ingredient) is preferably aerated, i.e., it has an overrun of more than 20 percent, preferably more than 30 percent, more preferably more than 50 percent. Preferably the base frozen confection has an overrun of less than 200 percent, more preferably less than 150 percent, most preferably less than 120 percent. Overrun is defined by the equation below and is measured at atmospheric pressure:

Overrun %=((density of mix−density of frozen confection)/density of frozen confection)×100

The frozen confection is a frozen product, such as ice cream, sherbet, water ice and the like. "Frozen," as used herein, denotes that the product is solidified under freezing conditions to a hardpack or pumpable consistency. The ice content of the frozen confection should be more than 15% but less than 45%. The frozen confection flavored with the viscous, free oil-containing flavorant or other ingredient may be combined with other ingredients such as wafers in an ice cream sandwich or an appropriate sauce in a sundae. The frozen confection is preferably a water-continuous emulsion.

Generally the product of the invention will include a dairy source, such as whole milk, skim milk, condensed milk, evaporated milk, cream, butter, butterfat, whey, milk solids non-fat, etc. The dairy source will generally contribute dairy fat and/or non-fat milk solids such as lactose and milk proteins, e.g. whey proteins and caseins. A dairy protein powder, such as whey protein, may be used as a protein source. Lactose will generally be present in the base frozen confections used in the invention within the range of from 0 to 8 wt percent, especially from 0.5 to 7 percent, more preferably from 3 to 8 wt percent (excluding the viscous flavoring—that is, the ice cream or the like to which the viscous flavoring is added). Dairy proteins will generally be present in the base frozen confections of the invention at from 1 to 5 wt percent, especially from 1 to 3 wt percent (excluding viscous flavoring). Other proteins may be present at from 0 to 3 wt percent.

While butter fat from cream and other dairy sources is preferred in the base frozen confection, alternative fat sources, such as vegetable fat, may be used in some embodiments of the invention. For example, fats may be taken from the group which includes cocoa butter, illipe, shea, palm, palm kernal, sal, soybean, cottonseed, coconut, rapeseed, canola, and sunflower oils and mixture thereof.

The level of triglyceride fat in the base frozen confection product, excluding the viscous flavorant, indeed preferably the total level of digestable lipid in the base frozen confection product, is preferably from 2 weight percent to 20 wt %, more preferably, from 3 wt % to 15 wt %.

If desired, the product may include an emulsifying agent. Typical emulsifying agents may be phospholipids and proteins, such as dairy or soy proteins, or esters of long chain fatty acids and a polyhydric alcohol. Fatty acid esters of glycerol, polyglycerol esters of fatty acids, sorbitan esters of fatty acids and polyoxyethylene and polyoxypropylene esters of fatty acids may be used but organoleptic properties, or course, must be considered. Mono- and di-glycerides may also be used but may also be omitted. Indeed, emulsifiers other than proteins and phospholipids may be omitted. If present, non-protein emulsifiers are used in amounts of about 0.03 percent to 0.5 percent, preferably 0.1 percent to 0.3 percent by weight of the base frozen confection, i.e. excluding the frozen confection to which the viscous flavoring is later added.

Gum stabilizers are particularly effective in controlling viscosity, providing mouth feel and improving whipping (aerating) properties; to provide a protective colloid to stabilize proteins to heat processing; to modify the surface chemistry of fat surfaces to minimize creaming; to provide acid stability to protein systems and; to increase freeze-thaw stability. Gums can be classified as neutral and acidic, straight- and branched-chain, gelling and non-gelling. The principal gums that may be used are Karaya gums, locust bean gum, carageenan, xanthan, guar, alginate and carboxymethyl cellulose.

Gums are generally used in concentrations of 0.02-0.5 weight percent of the base frozen confection composition. Because of differing functionalities, combinations of certain gums may provide a better product than a single gum. For instance, for some types of frozen confections karaya gum is ideally used together with polydextrose.

The stabilizer may be microcrystalline cellulose as described in U.S. Pat. No. 5,209,942, e.g., Avicel 581, which is activated or "peptized." A combination of microcrystalline cellulose and sodium carboxymethyl cellulose (CMC) may give good results.

Microcrystalline cellulose has been listed in the Fourth Supplement to the Food Chemicals Codex, First Edition, by the National Academy of Sciences-National research Council as: Cellulose, Microcrystalline (cellulose gel). Cellulose gel in combination with cellulose gum is especially preferred.

Another component may comprise one or any combination of carboxymethylcellulose (in addition to that with which the microcrystalline cellulose may be coated), xanthan gum, starch and alginate.

If desired, gelatin, e.g., 225 bloom, may be included in the base frozen confection compositions at levels of say 0.1-1 wt percent, especially from 0.1-0.3 wt percent. Certain salts such as phosphates and chlorides may be employed to alter the buffering capacity of the system and to improve the water binding capacity of proteins and improve solubility and flavor. Sodium chloride and sodium monophosphate at very low levels are preferred but calcium phosphate and particularly monocalcium phosphate may also be employed. Sodium chloride is preferred at levels of 0.05 percent to 0.3 percent of the base frozen confection; and sodium monophosphate is preferred at levels of 0.01 percent to 0.1 percent of the base frozen confection.

Generally the compositions of the invention will be naturally sweetened. Natural sources of sweetness include sucrose (liquid or solids), glucose, fructose, and corn syrup (liquid or solids). Other sweeteners include lactose, maltose, and galactose. Levels of sugars and sugar sources preferably result in sugar solids levels of up to 28 wt percent in the base frozen confection, preferably from 5 to 24 wt percent, especially from 10 to 24 wt percent.

If it is desired to use artificial sweeteners, any of the artificial sweeteners well known in the art may be used, such as aspartame, saccharine, Alitame (obtainable from Pfizer), acesulfame K (obtainable from Hoechst), cyclamates, neotame, sucralose and the like, and mixtures thereof. The sweeteners are used in varying amounts of about 0.005 percent to 1 percent of the base frozen confection, preferably 0.007 percent to 0.73 percent depending on the sweetener, for example. Aspartame may be used at a level of 0.01 percent to 0.15 percent of the base frozen confection, preferably at a level of 0.01 percent to 0.05 percent. Acesulfame K is preferred at a level of 0.01 percent to 0.15 percent of the base frozen confection.

Natural low- or non-caloric sweeteners such as stevia may be used at levels of from 0.01 to 0.15, especially 0.01 to 0.05 of the base frozen confection.

If desired, the product may include polydextrose. Polydextrose functions both as a bulking agent and as a fiber source and is preferably included at from 1 to 10 wt percent, especially from 3 to 6 wt percent of the base frozen confection.

Polydextrose may be obtained under the brand name Litesse from Danisco Sweeteners. Among other fiber sources which may be included in the compositions of the invention are fructose oligosaccharides such as inulin. Additional bulking agents which may be used include maltodextrin, sugar alcohols, corn syrup solids, sugars or starches. Total bulking agent levels in the base frozen confections of the invention will may be from about 5 percent to 20 percent, preferably 13 percent to 16 percent.

If desired, sugar alcohols such as glycerol, sorbitol, lactatol, maltitol, manitol, etc. may be used to control ice formation. If present, sugar alcohols may be used in an amount of about 1 percent to 8 percent, preferably 2.5 percent to 8.0 percent of the base frozen confection. However, the present invention also contemplates formulations in which glycerol is excluded.

In addition to the viscous, free oil-containing, flavoring, other flavorings are preferably added to the product but preferably in amounts that will impart a mild, pleasant flavor. The flavoring may be any of the commercial flavors employed in ice cream, such as varying types of cocoa, pure vanilla or artificial flavor, such as vanillin, ethyl vanillin, chocolate, extracts, spices and the like. It will further be appreciated that many flavor variations may be obtained by combinations of the basic flavors. The confection compositions are flavored to taste as mentioned above. Suitable flavorants may also include seasoning, such as salt, and imitation fruit or chocolate flavors either singly or in any suitable combination.

Malt powder can be used, e.g., to impart flavor, preferably at levels of from 0.01 to 3.0 wt percent of the base frozen confection, especially from 0.05 to 1 percent.

Preservatives such as potassium sorbate may be used as desired.

Adjuncts such as wafers, variegates (in addition to the viscous, free oil-containing flavorings) and sauces/coatings may be included as desired. In the case of sauces, coatings, they are typically present at from 5 to 30 weight percent of the viscous flavorant/ingredient containing frozen confection of the invention (including the weight of the sauce/coating.)

Water/moisture/ice will generally constitute the balance of the base frozen confection at, e.g., from 40-90 wt %, especially from 50-75 wt %.

Apart from the addition of the viscous flavorant/ingredient, processes used for the manufacture of the product are similar to those used for conventional frozen confections. Typical process steps include: ingredient blending, pumping, pasteurization, homogenization, cooking, aeration, freezing and packaging. In accordance with the invention, after freezing and before packaging, the frozen confection is combined with the viscous, free oil-containing flavorant/ingredient in the static mixer to form the frozen confection of the invention.

Products can be manufactured by batch or by continuous processes, preferably continuous. Ingredients may be either liquid or dry, or a combination of both. Liquid ingredients can be blended by the use of positive metering pumps to a mixing tank or by in-line blending. Dry ingredients must be hydrated during the blending operations. This is most commonly accomplished by the use of turbine mixers in processing vats or by incorporating the dry material through a high speed, centrifugal pump. The blending temperature depends upon the nature of the ingredients, but it must be above the melting point of any fat and sufficient to fully hydrate any gums used as stabilizers and any proteins.

Pasteurization is generally carried out in high temperature short time (HTST) units, in which the homogenizer is integrated into the pasteurization system. Protein and any microcrystalline cellulose are advisedly fully hydrated before adding other components which might interfere with the hydration.

SEM Analysis

All SEM analyses described below were performed using a JSM 6310F scanning electron microscope fitted with an Oxford Instruments ITC4 controlled cold stage. The samples were prepared using the Hexland CP2000 preparation equipment. A sample of size 5×5×3 mm was taken from the centre of a 500 ml block of ice cream. This sample was mounted onto an aluminum stub and plunged into nitrogen slush. The sample was fractured and the surface coated with Au/Pd at −115 degC and $2 \times 10^{-1}$ mBar. The sample was examined under microscope conditions of −160 degC and $1 \times 10^{-8}$ Pa.

Quantification of Gas Structure from SEM Images

The ImageJ 1.48v (National Institute of Health, USA) software run on a Java 1.6.0_20 platform was used to quantify the gas structure in ice cream by measuring the gas cell size distribution from SEM images.

All sizes were measured from SEM micrographs at ×100 magnification using the ImageJ image analysis software. This magnification was such that there were approximately 300 gas cells per image. The scale of the image was set by manually measuring the scale on the image and calculating the size per pixel. The program was used semi-automatically by drawing the diameters, which the program would then mark and measure. The diameter of each bubble was marked, so that the area of that bubble was accurately described by that length. The distribution was analyzed using the maximum diameter parameter. All gas cells present on a SEM micrograph were counted and up to four SEM images were used. In general at least 1000 gas cells were counted. The average size was determined as the number average $(d(1,0))$ of the individual cell sizes.

Quantification of Fat Crystal Structures from SEM Images

The ImageJ 1.48v (National Institute of Health, USA) software run on a Java 1.6.0_20 platform was used to quantify the fat crystal structures in ice cream.

All sizes were measured from SEM micrographs at λ1000 magnification using the ImageJ image analysis software. This magnification was such that there were approximately 5 gas cells per image. The scale of the image was set by manually measuring the scale on the image and calculating the size per pixel. The program was used semi-automatically by using the free form tool to circle each relevant air structure. The program was used to mark the air structure and calculate the total area of that structure. All gas cells present on a SEM micrograph were counted and up to four SEM images were used. After marking all of the air structures on a single image, each of the crystalline fat structures were marked using the point selection tool. The results were then analyzed to find the number of fat structures over the entire marked area.

Unless stated otherwise or required by context, the terms "fat" can be either liquid or solid at room temperature and "oil" is liquid at room temperature. In addition, unless otherwise stated or required by context, percentages are by weight. Unless otherwise stated or required by context weight percentages for the base frozen confection exclude the viscous flavorant/ingredient. Unless otherwise indicated or required by context, weight percentages for the viscous flavored frozen confection include the viscous flavorant/ingredient but exclude any coatings. As used herein the term viscous ingredient includes, but is not limited to, viscous flavorant. Homogeneous means that the frozen confection appears to the eye and to the taste to be a single material and that the presence of more than one material is barely, if at all, discernable.

Example

The purpose of this experiment is to test and compare two different methods of adding to ice cream a peanut butter base at various levels of peanut butter. The goal of the experiment is to compare the results. Two methods of adding peanut butter base were tested during the experiment: (A) mixing with a static mixer according to the invention and (B) adding peanut butter base to a univat mixing tank (post-pasteurization). The peanut butter base was added at various levels between 2.5 and 20 weight percent, particularly focusing on 5, 12 and 16%.

Method (A) is according to the process of the invention whereas Method (B) reflects a more conventional method wherein peanut butter base has been added to the univat without use of a static mixer.

Figure 2:
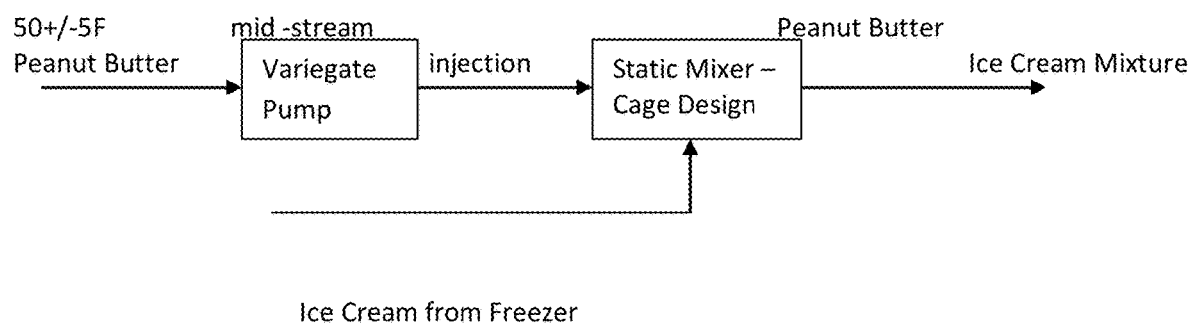
FIG. 2 is a schematic diagram of a second part of the ice cream production process.

FIG. 1 outlines the ice cream production process and the methods being investigated. FIG. 2 shows a mixing flow diagram for a static mixer in the process according to the invention. The following equipment/parameters were used:

The univat is a 25 gallon continuously stirred vessel. The vessel is agitated using a Lightnin (brand name) mixer, with ¼ HP.

A center point sparger was located just prior to the first static mixing element.

Pasteurization Temperature at end of hold tube: 182.0-185.1° F.

Pasteurization Flow rate: 3.6-4.0 L/min

Homogenization Pressures: 2100 psi first stage, 600 psi second stage

Overrun: 100%

Ice Cream Extrusion Temperature: 23.7-24.5° F.

Freezer flow rate: 120 L/hr

The formula for the frozen confection (ice cream) was as follows:

| Ingredient | wt % |
|---|---|
| BUTTER FAT | 8. |
| SKIMMED MILK POWDER | 10. |
| SUCROSE | 13. |
| CREAM | 4. |
| FLAVORING | 0.01 |
| CARRAGENAN | 0.02 |
| LOCUST BEAN GUM | 0.14 |
| WATER | 64.632 |
| Mono & diglycerides of fatty acids | 0.2 |

Procedure:

To establish the method that produces the best results, the only changes to the process should be the method of peanut butter base addition and the amount added. Unfortunately, it is impossible to perfectly replicate the process due to uncontrolled factors. To fully understand the results of the experiment, it is important to consider each of the factors that might contribute to differences between the samples.

Category:
Inputs—The variables that are changing in the process
  Method (Static, Univat)
  Amount of Peanut Butter
Controlled Factors—Factors that are held constant in throughout the tests
  Pasteurization Technique: Always HTST
  Homogenization Pressure
  Overrun
  Temperature (Compressor Work Load)
  Batch Formula
  Freezer: Hoyer ECT-5
  Flow Rate
Uncontrolled Factors—Factors that cannot be controlled
  Date of Mixing and Freezing
  New Batch for each experimental sample
  Ambient Temperature
  Batch and Consistency of PB (Mixed by hand)

Outputs—Results from all contributing factors
Statistical Analysis of Microstructure of Ice Cream
Cup Weight of Product—Plant Trials After looking at each category in depth, it was determined that the uncontrolled factors should not produce a significant change in the finished product. Therefore, the experiment provides a reasonable assessment of product microstructure associated with each method. Each variant was sampled and microstructure was examined in depth. The results from these tests can be found in the following section.

Results and Discussion:

In its simplest form, ice cream is a frozen and aerated mixture of water, cream and sugars but the physics of the resulting product is complex. The presence of a fine ice cream microstructure is important to produce the desired texture and quality of ice cream. Organoleptic evaluation of ice cream has shown that small air cells and ice crystals are associated with increased creaminess and reduced iciness, important criteria for good quality ice cream. The use of bulky flavors with free liquid oil can destabilize the ice cream foam under shear during the freezing and dosing process, resulting in a coarse air dispersion. This occurs via a mechanism of film spreading of the free oil at the air-water interface resulting in significant gas cell coalescence. This drives further gas cell coarsening via disproportionation resulting in a significantly increased range of gas cell sizes. In addition, the shear forces exerted during the conveying and dosing of ice cream can further destabilize the foam resulting in a coarser structure and increased variation in dosing accuracy.

A typical gas cell size distribution of ice cream ex-freezer is a Log-normal (Galton) distribution; however any destabilization of the foam affects the distribution of air bubbles in ice cream from this typical to a more broad distribution. Therefore analysis of the gas cell distribution and degree of deviation from a Log-normal distribution gives an indication of the extent of gas cell coarsening occurring.

We have found that the use of a static mixer will improve the distribution of the gas cell size by restricting the free oil from destabilizing the microstructure of the ice cream. Samples were made using both the conventional method illustrated in FIG. 1 and the method according to the invention illustrated in FIGS. 1 and 2 and analyzed with SEM technology. Images were captured at magnifications of 100-4000 times.

SEM images at ×100, ×300, ×1000 and ×4000 were collected to compare the gas cell size and fat at gas cell interfaces. Two spots were imaged for each ice cream variation.

Processing using both Univat Mixer and Static Mixer (according to the invention):

At low magnification, no major difference of air cell size was observed among different peanut butter contents. At high magnification of ×1000 and ×4000, more crystal like structures were observed on the gas cell interfaces with higher peanut butter content.

Process using Univat Mixer but not the Static Mixer (not in accordance with the invention):

At low magnification, the air cell size range increases with higher peanut butter content. At high magnification, more crystal like structures observed on the gas cell interfaces with higher peanut butter content.

Comparison:

5% PB ice creams have comparable air cell size between Static and Univat mixer.

The air cell size range becomes wider with increased peanut butter content in Univat mixer, while the air cell size remains the same when a Static mixer is additionally employed in accordance with the invention.

FIG. 3 shows SEM images of ice cream microstructure for a) on the left an ice cream made using the Static mixer process at 100× magnification where the ice cream contained 12% peanut butter and b) on the right ice cream made using the conventional process using a univat without a Static mixer at 100× magnification where the ice cream contained 12% peanut butter.

FIG. 4 shows SEM images of ice cream microstructure for a) on the left an ice cream made using the Static mixer process at 100× magnification where the ice cream contained 16% peanut butter and b) on the right ice cream made using the conventional process using a univat without a Static mixer at 100× magnification where the ice cream contained 16% peanut butter.

FIG. 5 shows SEM images of ice cream microstructure for a) on the left an ice cream made using the Static mixer process at 1000× magnification where the ice cream contained 12% peanut butter and b) on the right ice cream made using the conventional process using a univat without a Static mixer at 1000× magnification where the ice cream contained 12% peanut butter.

FIG. 6 shows SEM images of ice cream microstructure for a) on the left an ice cream made using the Static mixer process at 4000× magnification where the ice cream contained 12% peanut butter and b) on the right ice cream made using the conventional process using a univat without a Static mixer at 4000× magnification where the ice cream contained 12% peanut butter.

Figure 7:
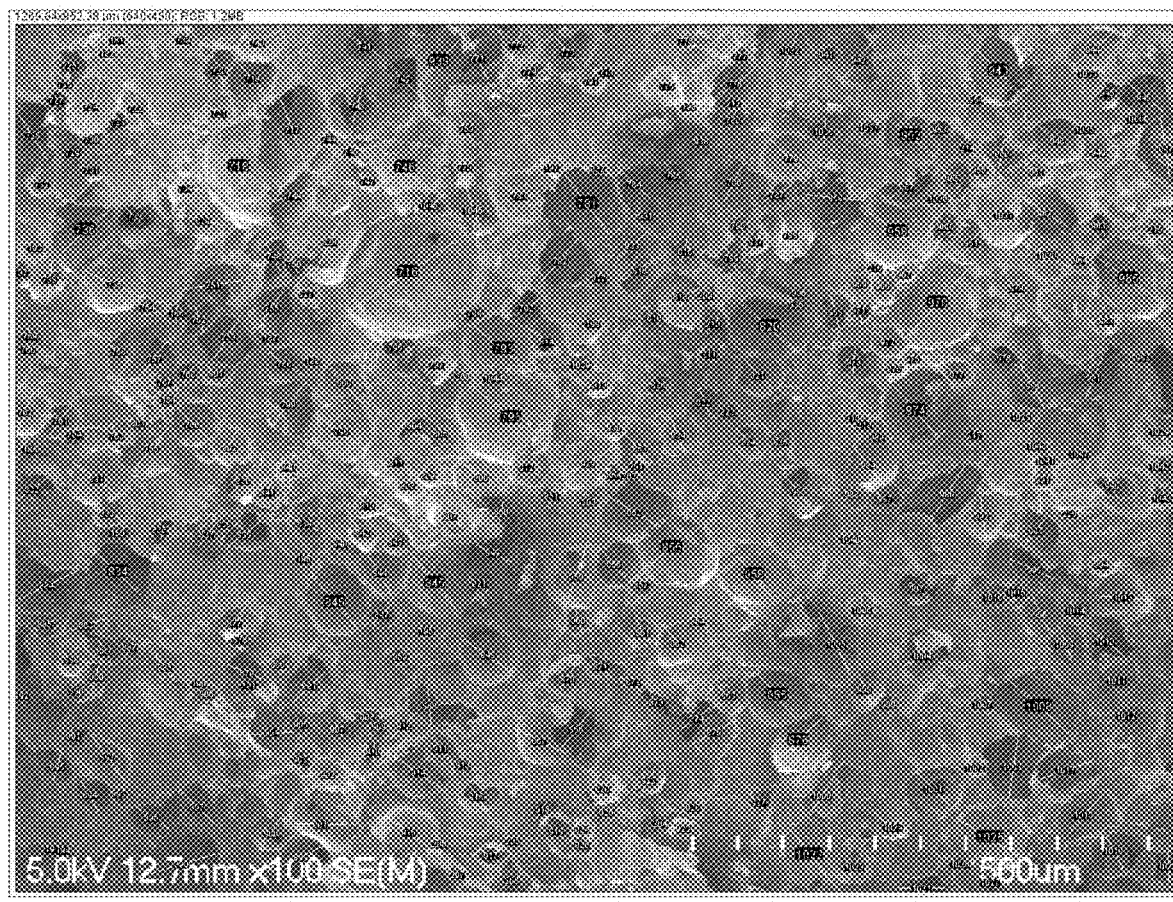
FIG. 7 shows scanning electron microscope images marked to show the diameter of the air bubbles.

FIG. 7 shows scanning electron microscope images marked to show the diameter of the air bubbles.

Qualitatively, these images help to confirm the advantages of the invention. At lower magnifications (×100), the presence of very large bubbles (>150 µm) is more common in samples produced by the Univat method. In addition, the largest bubbles in the Univat SEMs are significantly larger than the largest bubbles in the Static mixer SEMs. Most importantly, the distribution of the bubble size on the Univat in this experiment is very atypical. There are a large number of very small bubbles, as well as a few gigantic air pockets. This distribution leads to poor homogeneity in the frozen ice cream. In addition, this microstructure does not hold up well to temperature abuse. At the higher magnification levels (×1000 and ×4000) the free fat is visible as rough crystalline flakes on the surface of the air bubbles. On the Univat images, these flakes cover the surface of the air pockets; however, there is a smaller percentage of flakes, not fully dispersed on the Static Mixer images. The presence of free fat, crystallized into flakes, on the air interface is a prerequisite for air destabilization. By limiting the dispersion of the free oil on the air interface, the air phase is kept more stable and the structure of the product is maintained.

To quantify these results, the size of each bubble needs to be sized. Using an image processing and analysis software called ImageJ, the diameters of each bubble on the ×100 SEM images were marked and measured. An example of these marked images can be found in FIG. 7. The diameter of each bubble was marked, so that the area of that bubble was accurately described by that length. A more detailed description of the SEM and image processing technique is provided above.

To compare the samples, the max bubble diameter and the standard deviation was compared for all of the data. This histogram can be found in FIG. 8 wherein for each percentage of peanut butter, the bar on the extreme left is the maximum size bubble for the process according to the invention using the static mixer, the next bar to the right is the maximum size bubble for the conventional process without the static mixer, the next bar to the right is the standard deviation for the process according to the invention using the static mixer and the right hand bar is the standard deviation for the conventional process.

Figure 8:
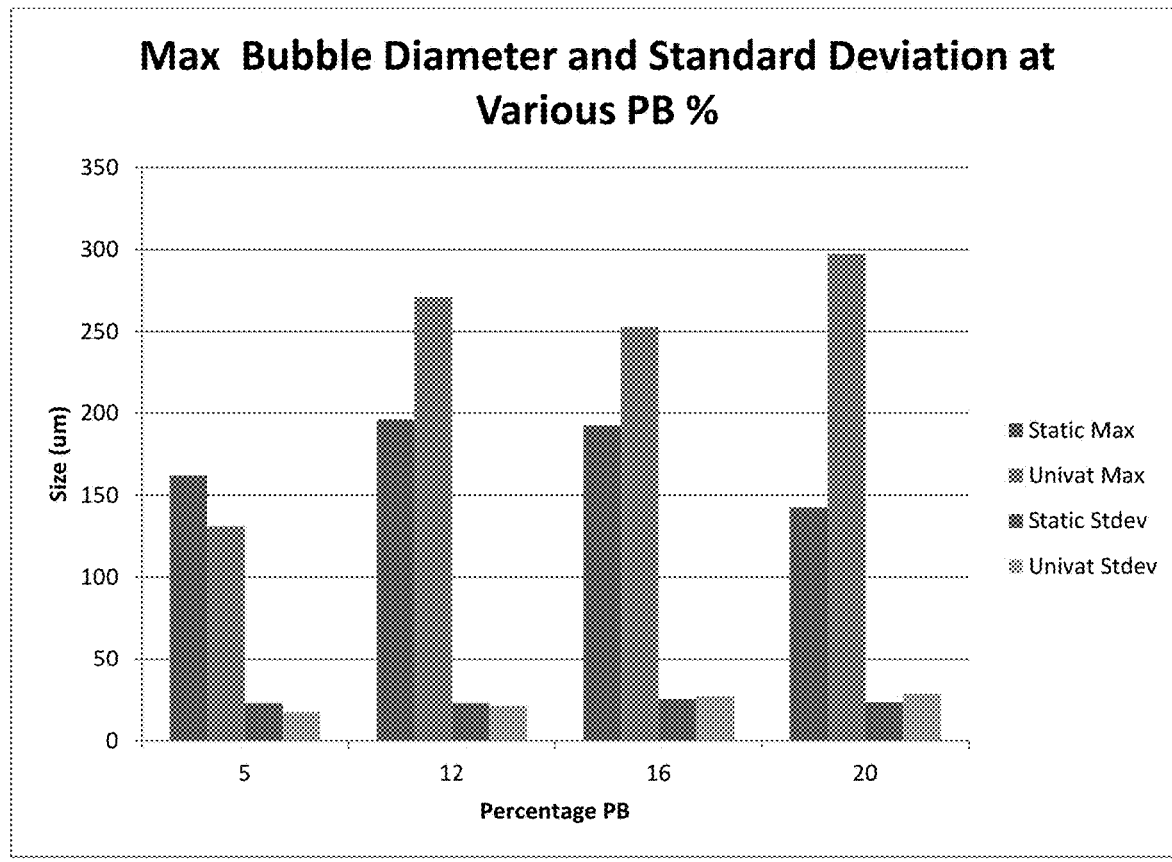
FIG. 8 is a histogram showing the standard deviation and maximum bubble size of samples according to the invention and conventional samples.

As shown in FIG. 8, the standard deviation and max bubble size of the Univat samples generally increase as the percentage of PB increases, while the Static mixer data stays relatively similar throughout. The histograms do not accurately show the poor distribution of the data due to the fact that large bubbles take up a large area of the image and are therefore uncommon.

In order to quantify the distribution, the probability density function (PDF) of a log-normal distribution will be used. A probability density function describes the likelihood for a variable to take a given value. PDFs are dependent on the type of distribution assumed. Therefore, if the value of probability density function is compared to the value given by number of bubbles marked, the relative distribution can be compared. For example, if 1000 air structures are marked, the largest bubble should fall near the 99.9 percentile category. This corresponds to a PDF value of 0.001 or 0.1 when multiplied to a percentile. The PDF equation for a log-normal distribution is given below.

$$PDF = \frac{1}{x*\sigma*\sqrt{2*\pi}} * e^{-\frac{(lnx-\mu)^2}{2\sigma^2}}$$

Figure 9:
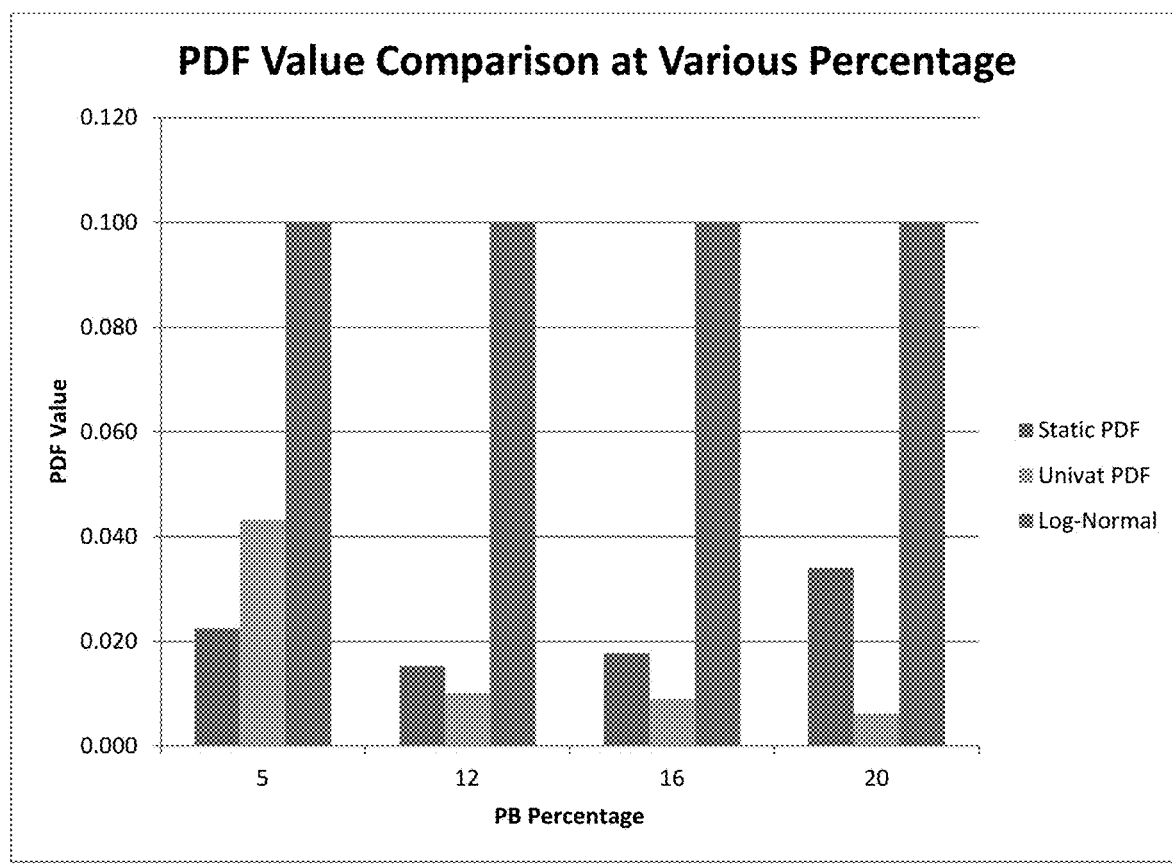
FIG. 9 is a histogram of the PDF values of the largest bubble at each percentage evaluated for samples according to the invention and for samples made according to a conventional process.

FIG. 9 shows a histogram of the PDF values of the largest bubble at each percentage evaluated. For each level of peanut butter, the left bar is the PDF for the process according to the invention, the middle bar is the PDF for the conventional process lacking the static mixer and the right bar is the log normal. The distribution become less log-normal as the product goes through more abuse. The hardening process, the shear stress and other factors lead to a more coarse distribution. This explains the low PDF values throughout all of the samples.

This graph shows that at low peanut butter percentages the conventional process using the Univat is successful at creating a typical distribution of gas cell size. However, at 12 percent the Univat begins to fail due to the additional free liquid oil that is spread across the gas cell interface, resulting in the coalescence and coarsening of the air bubbles. The static mixer does not encounter this issue, but has a low value throughout due to the shear stress imparted upon mixing. At levels above the 5% tested, the static mixer method has a significant benefit over the Univat method. To further this point, the fill weight data presented below shows that this benefit is apparent at 5% with other mix formulas.

Fill weight data that was collected at production plant trials demonstrates this effect to a further extent. Data on the weight of three different products was collected using the Univat and/or the static mixer. The processing used prior to the static mixer was the processing typically used in that plant for that product. These three products contain 2.5, 5 and 15 percent by weight peanut butter within the ice cream mix or frozen ice cream. The standard percent deviation of each product was found using each method and compared. The results are found in the histogram of FIG. 10 wherein for each level of peanut butter wt % in the composition, the left bar is for the composition and process according to the invention and the right bar is for a conventional product and process.

Figure 10:
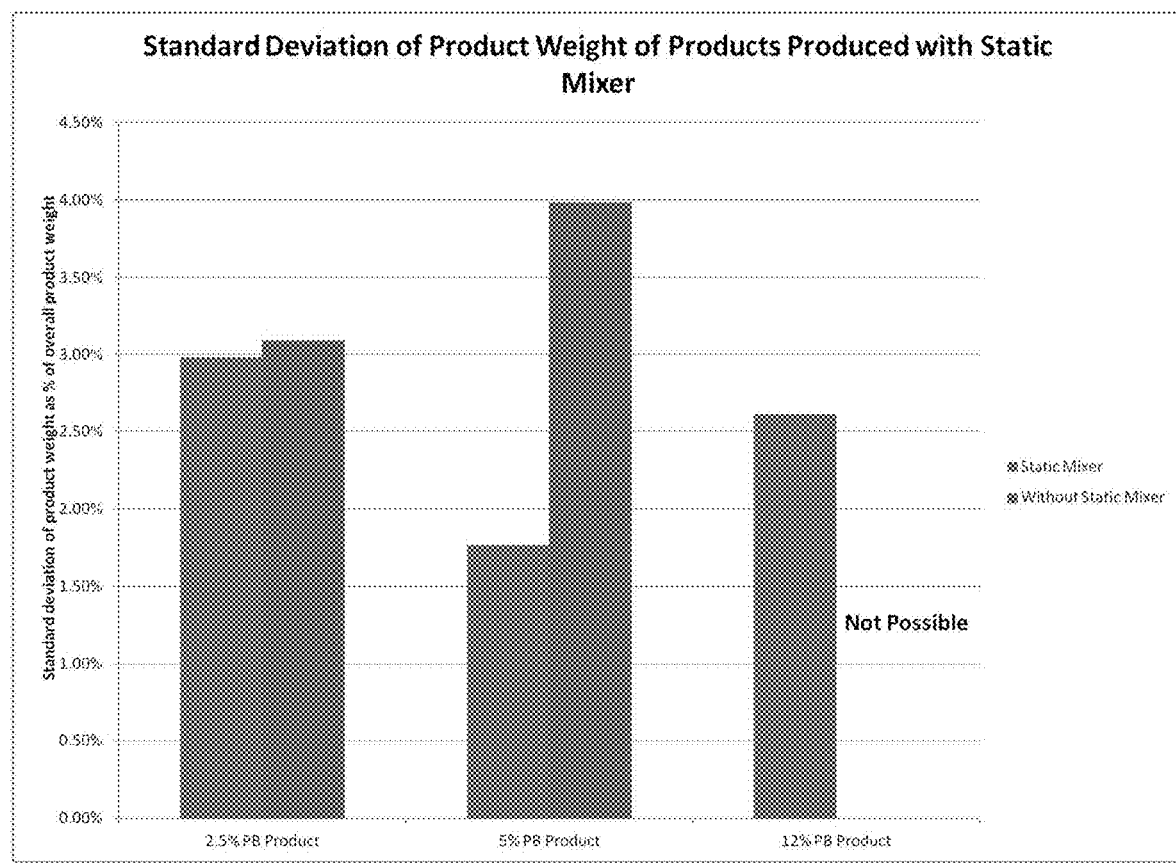
FIG. 10 is a histogram showing standard deviation of product weight for products made in accordance with the invention and for conventional products.

This data also helps to confirm the invention. It shows that the static mixer helps to reduce the weight variation in the produced product. This weight variation is caused by flow variability in the ice cream production process; the flow variability is caused by non-homogeneity and instability of the frozen ice cream foam attributable to addition of free liquid fat present in the peanut butter. In all three products, the use of the static mixer reduces the standard deviation for the dosing weight. It is important to note that due to scale up, it was not possible to produce the 15% product without the static mixer on a production level, as can be seen in FIG. 10, because the instability of the ice cream product was too great.

It should be noted that the examples provided for the weight variation data are not the same as those in which the gas sizes were measured. Furthermore they are not directly comparable to one another since the formulas and dosing geometries used at each of the % additions were not the same. However the data for a given % peanut butter addition comparing the addition method is directly comparable. In general, as the percentage of peanut butter increases, the static mixer significantly out performs the Univat with respect to controlling weight variation on dosing.

Figure 11:
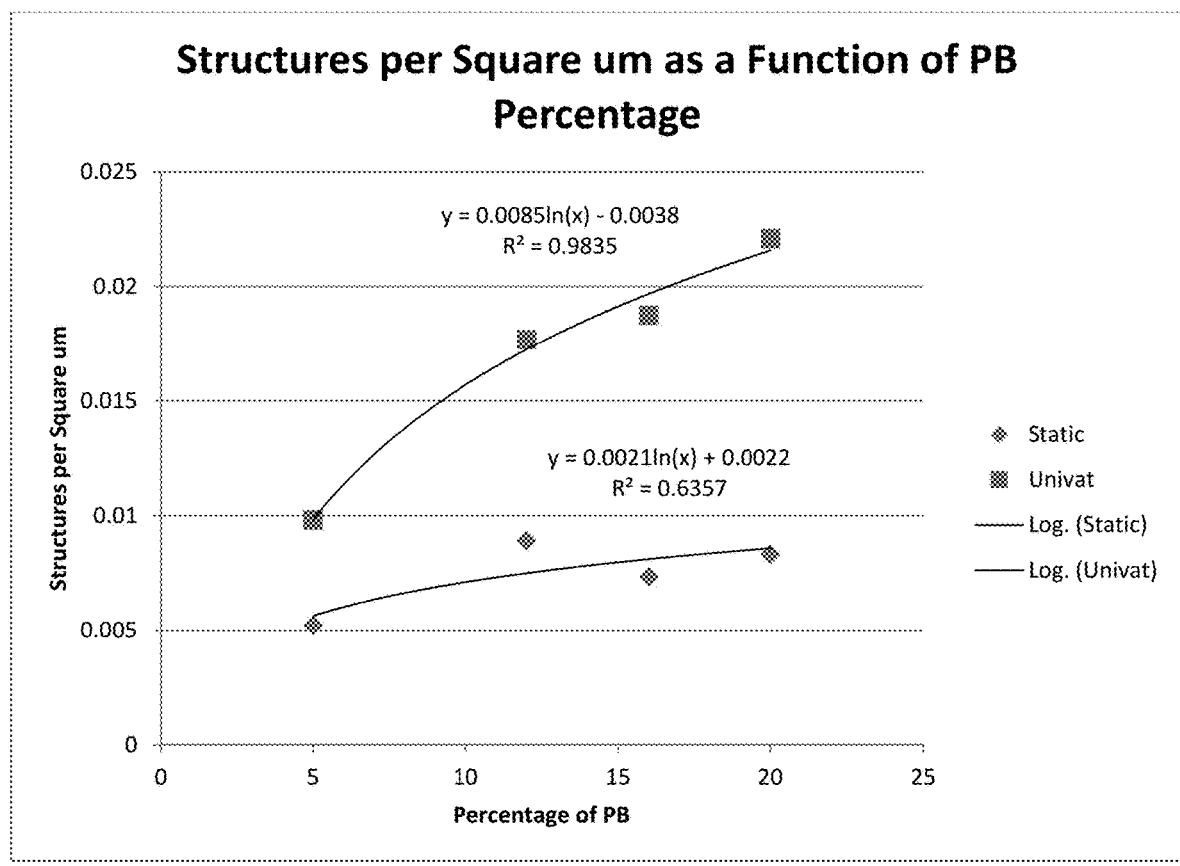
FIG. 11 is a graph of the crystalline structures per square um as a function of PB Percentage.

The invention is also reflected in the fact that the number density of crystalline fat particles on the air interface is lower for products according to the invention as compared to the product made using a conventional process. The presence of too many crystalline fat particles on the air interface adversely affects the stability of air bubbles and product quality. FIG. 11 shows graphically that the number of crystalline fat structures per square micron is substantially higher for the product made by the conventional process and increases as the wt % of peanut butter increases. The data in FIG. 11 was calculated using the procedure for quantification of fat crystal structures from SEM images set forth above.

Example 1 is repeated using hazelnut butter as the viscous flavorant.

FIG. 13 shows SEM images of ice cream microstructure taken at 1000× magnification for a) on the top, an ice cream made using the Static mixer process where the ice cream contains 5% hazelnut butter and b) on the bottom, ice cream made using the conventional process using a univat without a Static mixer where the ice cream contains 5% hazelnut butter.

FIG. 14 shows SEM images of ice cream microstructure taken at 1000× magnification for a) on the top, an ice cream made using the Static mixer process of the invention where the ice cream contains 12% hazelnut butter and b) on the bottom, ice cream made using the conventional process using a univat without a Static mixer where the ice cream contains 12% hazelnut butter. At least two, large, spiky, fat structures can be seen in the right half of the image.

FIG. 15 shows SEM images of ice cream microstructure taken at 1000× magnification for a) on the top, an ice cream made using the Static mixer process of the invention where the ice cream contains 20% hazelnut butter and b) on the bottom, ice cream made using the conventional process using a univat without a Static mixer where the ice cream contains 20% hazelnut butter. A large, well-defined, spiky, fat structure is visible left of center of the image.

Figure 12A:
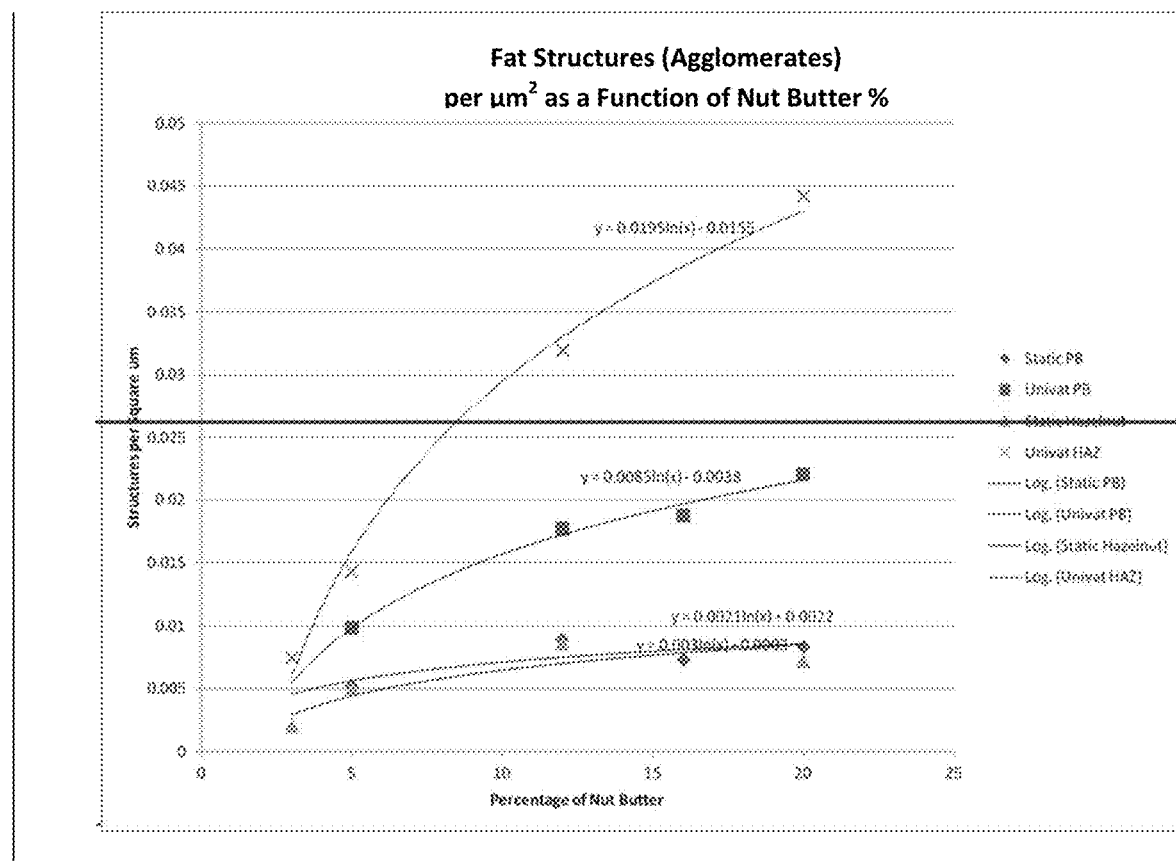
FIG. 12a is a graph of the crystalline structures per square um as a function of hazelnut butter and of peanut butter percentages.
Figure 12B:
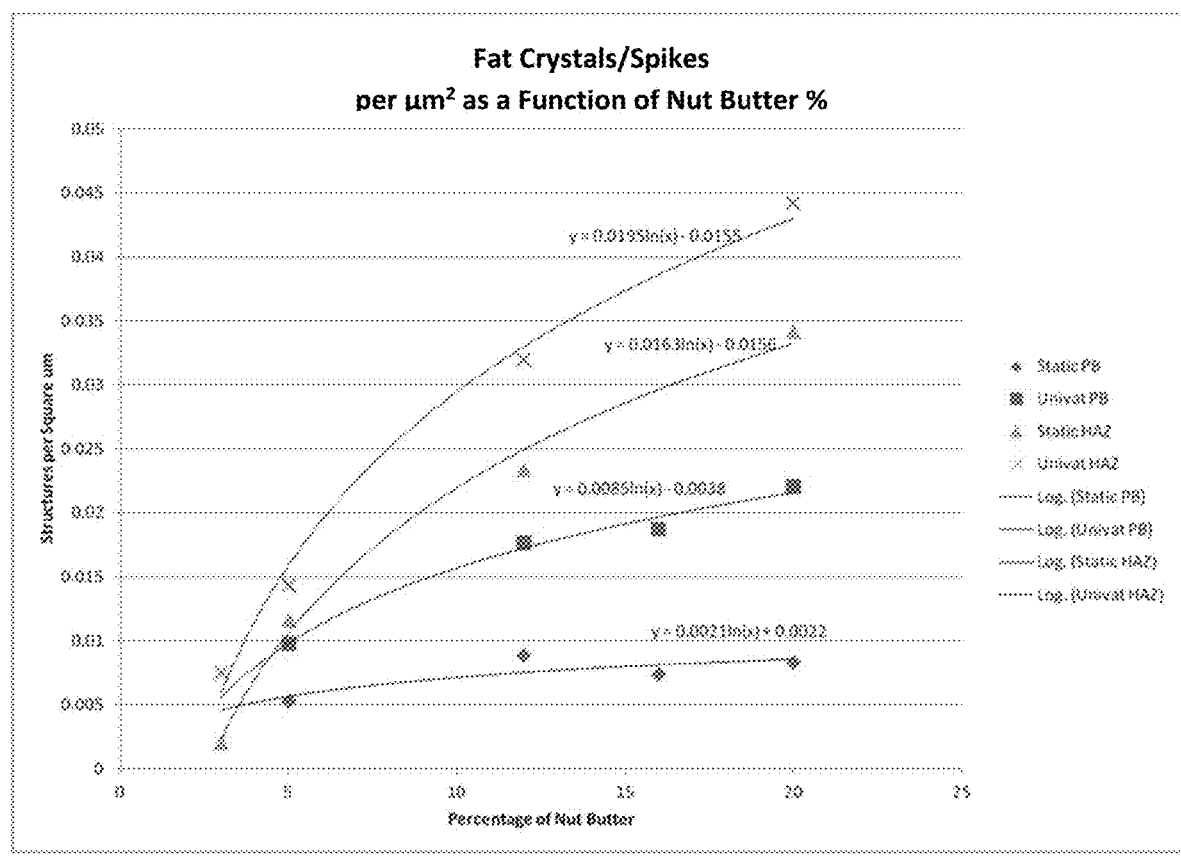
FIG. 12b is a graph of crystals/spikes per square um as a function of hazelnut butter percentage and of peanut butter percentages.

FIG. 12a shows graphically that the number of crystalline fat structures per square micron is substantially higher for the products made by the conventional process than for the products of the invention; the number of crystalline fat structures per square micron increases as the wt % of hazelnut butter and peanut butter increases. FIG. 12b shows graphically that the number of crystals/spikes per square micron is substantially higher for the hazelnut butter product made by the conventional process than for the hazelnut butter product made by the process of the invention and increases as the wt % of hazelnut butter increases. Results are also shown for peanut butter. The data in FIGS. 12a and 12b was calculated using the procedure for quantification of fat crystal structures from SEM images set forth above.

All of this data shows that the static mixer not only removes the allergen from the freezing process, but also improves the quality of the product at the microscopic level.

It should be understood of course that the specific forms of the invention herein illustrated and described are intended to be representative only, as certain changes may be made therein without departing from the clear teaching of the disclosure. Accordingly, reference should be made to the appended claims in determining the full scope.

The invention claimed is:

1. A frozen aerated confection flavored with a viscous free oil-containing flavorant or ingredient comprising at least 5 wt. % viscous flavoring/ingredient and at least 80 wt % of a base frozen confection, said frozen aerated confection having fewer than 0.01 crystalline structures per square micron of air bubble wherein the frozen confection flavored with viscous, free oil-containing flavorant/ingredient is homogeneous to eye and taste the flavorant/ingredients being in the form of a paste or butter, wherein the frozen aerated confection flavored with a viscous free oil-containing flavorant or ingredient is made by freezing and aerating mixed ingredients to produce the base frozen confection, feeding the free oil-containing viscous flavoring or other ingredient and the base frozen confection into a static mixer to produce the frozen confection flavored with a viscous, free oil-containing flavorant/ingredient, and wherein the viscous free oil-containing ingredient is selected from the group of nut butters and coconut paste.

2. The frozen aerated confection according to claim 1 having fewer than 0.009 structures per square micron of air bubble.

3. The frozen aerated confection according to claim 1 having fewer than 0.0075 structures per square micron of air bubble.

4. The frozen confection according to claim 1 wherein the nut butter is selected from the group of peanut butter, almond butter and coconut paste.

5. The frozen aerated confection according to claim 1 comprising at least 6 wt % free oil-containing flavorant or ingredient wherein the free oil-containing flavorant or ingredient is peanut butter.

6. The frozen aerated confection according to claim 5 comprising at least 12 wt % free oil-containing flavorant or ingredient.

7. The frozen aerated confection according to claim 1 comprising at least 8 wt % free oil-containing flavorant or ingredient.

8. The frozen aerated confection according to claim 7 comprising at least 11 wt of the viscous free-oil containing flavorant or ingredient.

9. The frozen confection according to claim 1 wherein the viscous free oil-containing ingredient is selected from the group of hazelnut butter.

10. A frozen aerated confection flavored with a viscous free oil-containing flavorant or ingredient comprising at least 10 wt % viscous flavoring/ingredient and at least 70 wt % of a base frozen confection, in which the PDF (probability density function) for the largest bubble in the frozen confection flavored with the viscous flavorant/ingredient is at least 0.013 wherein the frozen confection flavored with viscous, free oil-containing flavorant/ingredient is homogeneous to eye and taste the flavorant/ingredients being in the form of a paste or butter, wherein the frozen aerated confection flavored with a viscous free oil-containing flavorant or ingredient is made by freezing and aerating mixed ingredients to produce the base frozen confection, feeding the free oil-containing viscous flavoring or other ingredient and the base frozen confection into a static mixer to produce the frozen confection flavored with a viscous free oil-containing flavorant/ingredient, and wherein the viscous free oil-containing ingredient is selected from the group of nut butters and coconut paste.

11. The frozen confection according to claim 10 wherein the PDF for the largest bubble is at least 0.015.

12. The frozen confection according to claim 10 wherein the PDF for the largest bubble is at least 0.018.

13. The frozen confection flavored with viscous free oil-containing flavorant or ingredient according to claim 10 having an overrun of from 20 to 150%.

14. The frozen confection flavored with viscous free oil-containing flavorant or ingredient according to claim 10 having at least 12 wt % viscous flavorant or ingredient.

15. The frozen confection according to claim 10 wherein the viscous free oil-containing ingredient is selected from the group of peanut butter.

16. The frozen confection flavored with viscous free oil-containing flavorant or ingredient according to claim 10 having at least 16 wt % viscous flavorant or ingredient.

17. The frozen confection flavored with viscous free oil-containing flavorant or ingredient according to claim 10 having at least 20 wt % viscous flavorant or ingredient.

18. A frozen aerated confection flavored with a viscous free oil-containing flavorant or ingredient comprising from 5-8 wt % viscous flavoring/ingredient and at least 80 wt % of a base frozen confection, said frozen aerated confection having fewer than 0.01 crystalline structures per square micron of air bubble wherein the frozen confection flavored with viscous, free oil-containing flavorant/ingredient is homogeneous to eye and taste the flavorant/ingredients being in the form of a paste or butter, wherein the frozen aerated confection flavored with a viscous free oil-containing flavorant or ingredient is made by freezing and aerating mixed ingredients to produce the base frozen confection, feeding the free oil-containing viscous flavoring or other ingredient and the base frozen confection into a static mixer to produce the frozen confection flavored with a viscous free oil-containing flavorant/ingredient, and wherein the viscous free oil-containing ingredient is selected from the group of nut butters and coconut paste.

19. The frozen aerated confection according to claim 18 having fewer than 0.075 crystalline structures per square micron of air bubble.

* * * * *